No. 680,253. Patented Aug. 13, 1901.
E. A. JONES.
ANIMAL POKE.
(Application filed May 9, 1901.)
(No Model.)

Inventor
E. A. Jones

Witnesses

Attorneys

UNITED STATES PATENT OFFICE.

EVERLY A. JONES, OF CASS CITY, MICHIGAN.

ANIMAL-POKE.

SPECIFICATION forming part of Letters Patent No. 680,253, dated August 13, 1901.

Application filed May 9, 1901. Serial No. 59,430. (No model.)

*To all whom it may concern:*

Be it known that I, EVERLY A. JONES, a citizen of the United States, residing at Cass City, in the county of Tuscola and State of Michigan, have invented certain new and useful Improvements in Animal-Pokes; and I do declare the following to be a full, clear, and exact description of the invention, such as will enable others skilled in the art to which it appertains to make and use the same.

The invention relates to animal-pokes, and more particularly to pokes for rams, by the employment of which during certain seasons of the year the rams may mingle and graze with the ewes, thus rendering it unnecessary, as is now the common practice, to separate the rams from the ewes, thus obviating the necessity of an attendant changing the stake two or three times a day to provide the ram with fresh grass spots to graze from.

The object of the invention is to provide a device of this character which shall be simple of construction, durable in use, and comparatively inexpensive of production and which may be easily applied to and removed from the animal.

With this object in view the invention consists of certain novel features of construction, combination, and arrangement of parts, which will be hereinafter more fully described, and particularly pointed out in the appended claim.

Figure 1:
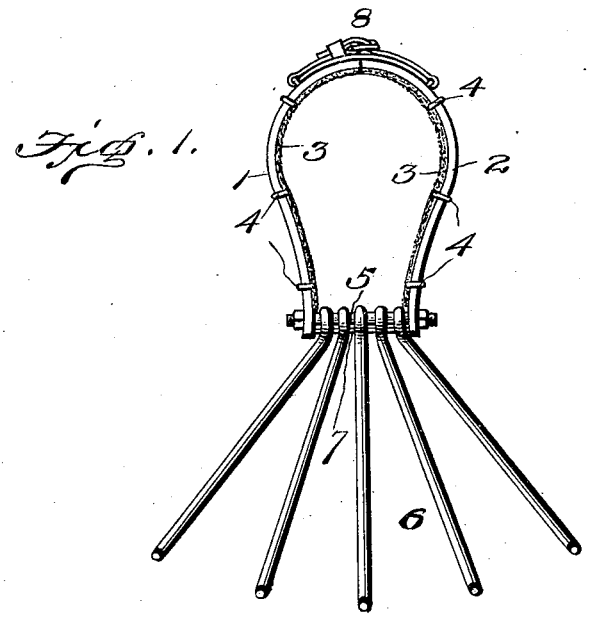
Figure 2:
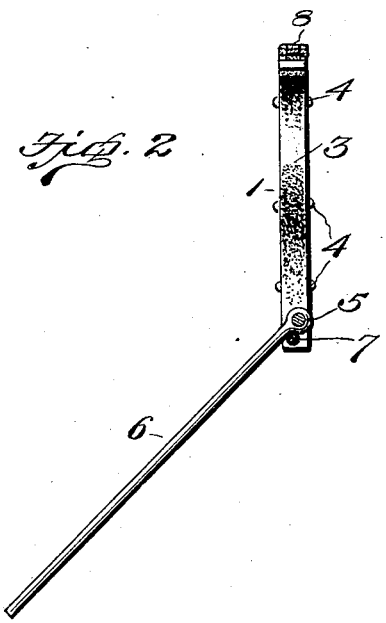

In the accompanying drawings, Figure 1 is a front elevation of my improved animal-poke, and Fig. 2 is a vertical sectional view.

Referring to the drawings, 1 and 2 denote two bowed sections, which form a yoke, and which preferably consist of strap-iron. Each section is provided with a soft lining 3 to prevent injury to the animal's neck. These linings are connected to the sections by loops 4, which permit of the lining being slipped off and replaced when worn with another lining. The lower ends of the bowed sections are connected together by a bolt 5, upon which are hung a series of prongs or arms 6, one of which projects forwardly and downwardly, and the remainder of which diverge or are spread out in fan shape from their pivotal points, as shown in Fig. 1, and are inclined downwardly and forwardly and held in that position by a pin or slot 7, located below and slightly in advance of the bolt 5, so as to effectually prevent a too close approach of the ram to the ewe either from a side or rear direction. The upper ends of the bowed sections are adjustably connected together by strap and buckles 8 or any other suitable devices.

When in place upon the animal's neck, the animal will be permitted to loll and lie around upon the ground as freely and with as much ease as if the yoke were not about his neck.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

In an animal-poke, the combination with a yoke, of prongs or arms pivoted at the lower end of the yoke, one of which projects forwardly and downwardly and the remainder of which diverge therefrom in fan-like fashion, and means for supporting the prongs or arms in an inclined position free to swing upwardly, substantially as set forth.

In testimony whereof I have hereunto set my hand in presence of two subscribing witnesses.

EVERLY A. JONES.

Witnesses:
THOMAS H. DODD,
HARRIET C. DEMING.